United States Patent

Biller

[11] Patent Number: 5,857,704
[45] Date of Patent: Jan. 12, 1999

[54] ADJUSTING DEVICE FOR A DEFLECTION FITTING

[75] Inventor: Dieter Biller, Alfdorf-Brech, Germany

[73] Assignee: TRW Occupant Restraint Systems GmbH, Alfdorf, Germany

[21] Appl. No.: 835,455

[22] Filed: Apr. 8, 1997

[30] Foreign Application Priority Data

Apr. 10, 1996 [DE] Germany ............... 296 06 521.8

[51] Int. Cl.$^6$ .................................................. B60R 22/20
[52] U.S. Cl. .................... 280/801.2; 280/801.1; 297/483
[58] Field of Search ................ 280/801.2, 801.1, 280/808, 806; 297/483, 468

[56] References Cited

U.S. PATENT DOCUMENTS

| | | | |
|---|---|---|---|
| 4,466,666 | 8/1984 | Takada | 280/801.2 |
| 4,989,900 | 2/1991 | Steinhuser | 280/801.2 |
| 5,482,325 | 1/1996 | Moller et al. | 280/801.2 |
| 5,522,618 | 6/1996 | Else | 280/801.2 |

*Primary Examiner*—Eric D. Culbreth
*Attorney, Agent, or Firm*—Tarolli, Sundheim, Covell, Tummino & Szabo

[57] ABSTRACT

An adjusting device for a deflection fitting of a vehicle safety belt system includes a rail provided with catch openings, and a slider mounted displaceably in the rail. The slider is adapted for connection to the deflection fitting and is provided with a detent mechanism for cooperation with the catch openings. The slider is further provided with a locking element which is functionally independent of the detent mechanism. The locking element is mounted at the slider pivotally between a neutral position in which it does not engage the rail, and a locking position in which it engages the rail and locks the slider in place.

8 Claims, 3 Drawing Sheets

ADJUSTING DEVICE FOR A DEFLECTION FITTING

FIELD OF THE INVENTION

The invention relates to an adjusting device for a deflection fitting of a vehicle safety belt system.

BACKGROUND OG THE INVENTION

An adjusting device for a deflection fitting of a vehicle safety belt system conventionally comprises a rail which is secured to the vehicle and is provided with catch openings, and a slider able to be slid in the rail, such slider being provided for mounting the deflection fitting and possessing a detent mechanism adapted to cooperate with the catch openings.

Such an adjusting device serves to adapt the way in which the safety belt is spread out to suit the vehicle occupant in the best possible manner. Problems may occur when using such an adjusting device, if the slider is located between two catch openings just when an accident happens, that is to say it is not anchored as required at a catch opening. Such problem is made even more acute if the safety belt system is provided with a belt pretensioner, which in an accident takes up slack in the safety belt system. The forces acting on the deflection fitting may prevent the detent mechanism from satisfactorily snapping into the next catch opening so that the slider is displaced downward in relation to the vehicle and consequently the action of the belt pretensioner is impaired as well. Therefore detent mechanisms have been proposed designed to ensure reliable snapping into the next following catch opening even if the slider is under extremely high downward acceleration in relation to the vehicle. However, with such an improved detent mechanism the action of the belt pretensioner is impaired by there being a certain distance to be moved through by the slider before the detent mechanism fits into the next following catch opening.

BRIEF DESCRIPTION OF THE INVENTION

The present invention provides an adjusting device of the type for vehicle safety belt system, in which, if during the process of belt pretensioning the detent mechanism should not successfully fit into one of the catch openings, the slider is reliably locked after the shortest possible displacement.

According to the invention, an adjusting device for a deflection fitting of a vehicle safety belt system comprises a rail provided with catch openings, and a slider mounted displaceably in the rail. The slider is adapted for connection to the deflection fitting and is provided with a detent mechanism for cooperation with the catch openings. The slider is further provided with a locking element which is functionally independent of the detent mechanism. The locking element is mounted at the slider pivotally between a neutral position in which it does not engage the rail, and a locking position in which it engages the rail and locks the slider in place. The locking element is displaced from the neutral position into the locking position by an acceleration of the slider downwards with respect to the rail. The locking element halts movement of the slider after a displacement of a few millimeters so that practically no further belt slack is created, if the detent mechanism does not fit into a catch opening as it should.

Further advantageous developments of the invention are defined in the dependent claims.

BRIEF DESCRIPTION OF THE DRAWINGS

The invention will now be described with reference to two embodiments, which are illustrated in the drawings.

DETAILED DESCRIPTION OF THE INVENTION

Figure 1:
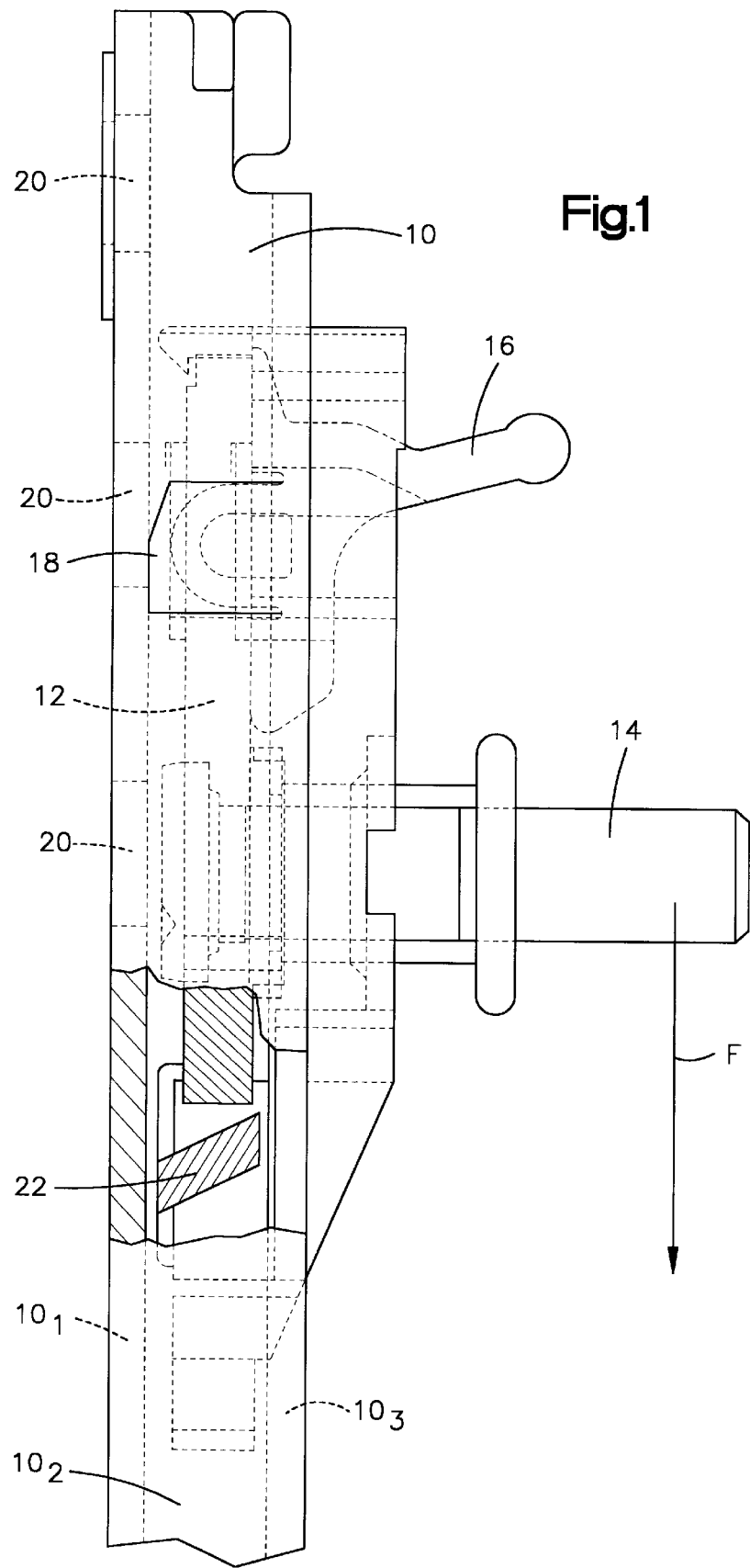
FIG. 1 is a diagrammatic and partially sectioned side elevation of a first embodiment of an adjusting device of the invention.

FIG. 1 shows a first embodiment of an adjusting device of the invention. The adjusting device comprises a rail 10 which is secured to the vehicle and in which a slider 12 slides, said slider comprising a pin 14 for the attachment of a deflection fitting (not illustrated). The rail comprises a bottom part $10_1$, two side parts $10_2$ which are perpendicular to same, and two front parts $10_3$ which are opposite to the bottom part $10_1$, said front parts extending from the side parts. On the slider 12 a detent mechanism 16, which is only indicated diagrammatically, is provided. By actuation of the detend mechanism, the slider 12 can be shifted in the longitudinal direction of the rail in relation to the vehicle upward and downward. The detent mechanism 16 possesses a sliding bolt 18 adapted to fit into catch openings 20 so that the slider 12 is locked in relation to the rail 10.

In this figure the slider 12 is depicted in a undesired operating position, which can however not be prevented in practice. The sliding bolt 18 is at a small distance underneath a catch opening 20 so that it can not fit into same. When, in this position, a downwardly directed force (due for example to the tightening action of a belt pretensioner for taking up slack in the safety belt) acts by way of the deflection fitting on the slider 12 as indicated by an arrow F, the slider 12 would move downward at least as far as to the next catch opening 20. This would be responsible for there being additional slack in the safety belt disadvantageous for the restraining action of the safety belt.

In order to preclude such a downward movement of the slider 12, the adjusting device of the invention is provided with a locking element 22 functionally independent from the detent mechanism 16.

The locking element 22 is so movingly mounted in the interior of the rail 10 on the slider 12 that it can both move to a limited extent in the longitudinal direction of the rail 10 in relation to the slider 12 and may also be rotated about its center of gravity. The locking element 22 has the form of an obliquely angled parallelepipedon, of which respectively two side surfaces are parallel on the one hand to the bottom part $10_1$ and, respectively, the front parts $10_3$ of the rail 10 and on the other hand to the side parts $10_2$ of the rail 10. When the slider 12 is subject to downward acceleration in relation to the vehicle, there will, owing to the inertia of the locking element 22, be relative movement between the locking element 22 and the slider 12 so that the slider will act on the edge of the locking element 22, which in terms of FIG. 1 is the upper edge, that is to say on an edge which in relation to the center of gravity of the locking element is arranged eccentrically. This leads to rotation of the locking element 22 clockwise. Accordingly, the locking element 22 jams between the bottom part $10_1$ and the front parts $10_3$ of the rail so that a downward movement of the slider 12 will be brought to a halt after a displacement of a few millimeters. The tightening action of a belt pretensioner is therefore practically not impeded by additional belt slack, even if the slider 12 is located in the inconvenient or undesired operational position illustrated in FIG. 1.

Figure 2:
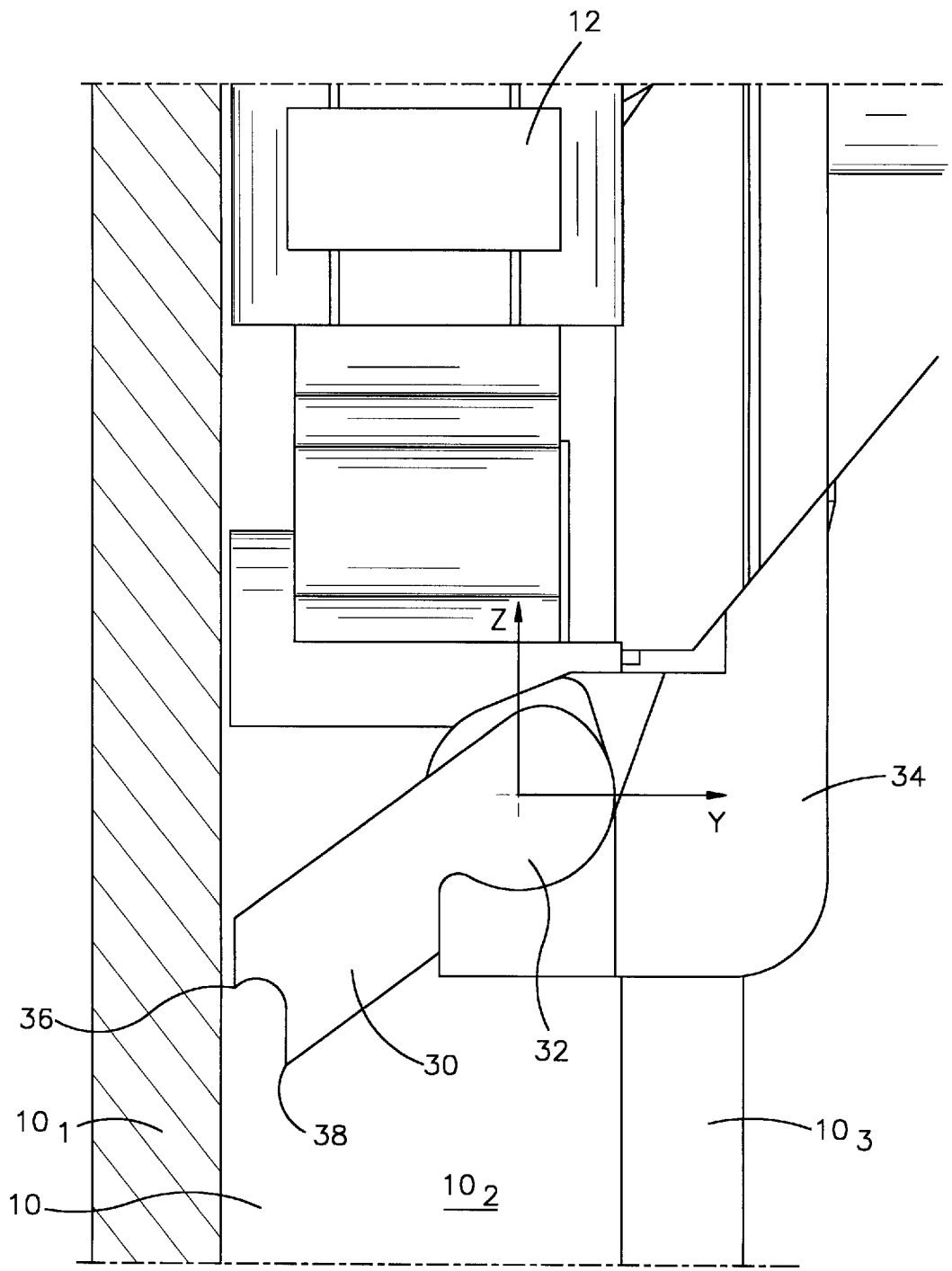
FIG. 2 is a diagrammatic and partially sectioned side elevation of a second embodiment of an adjusting device of the invention.
Figure 3:
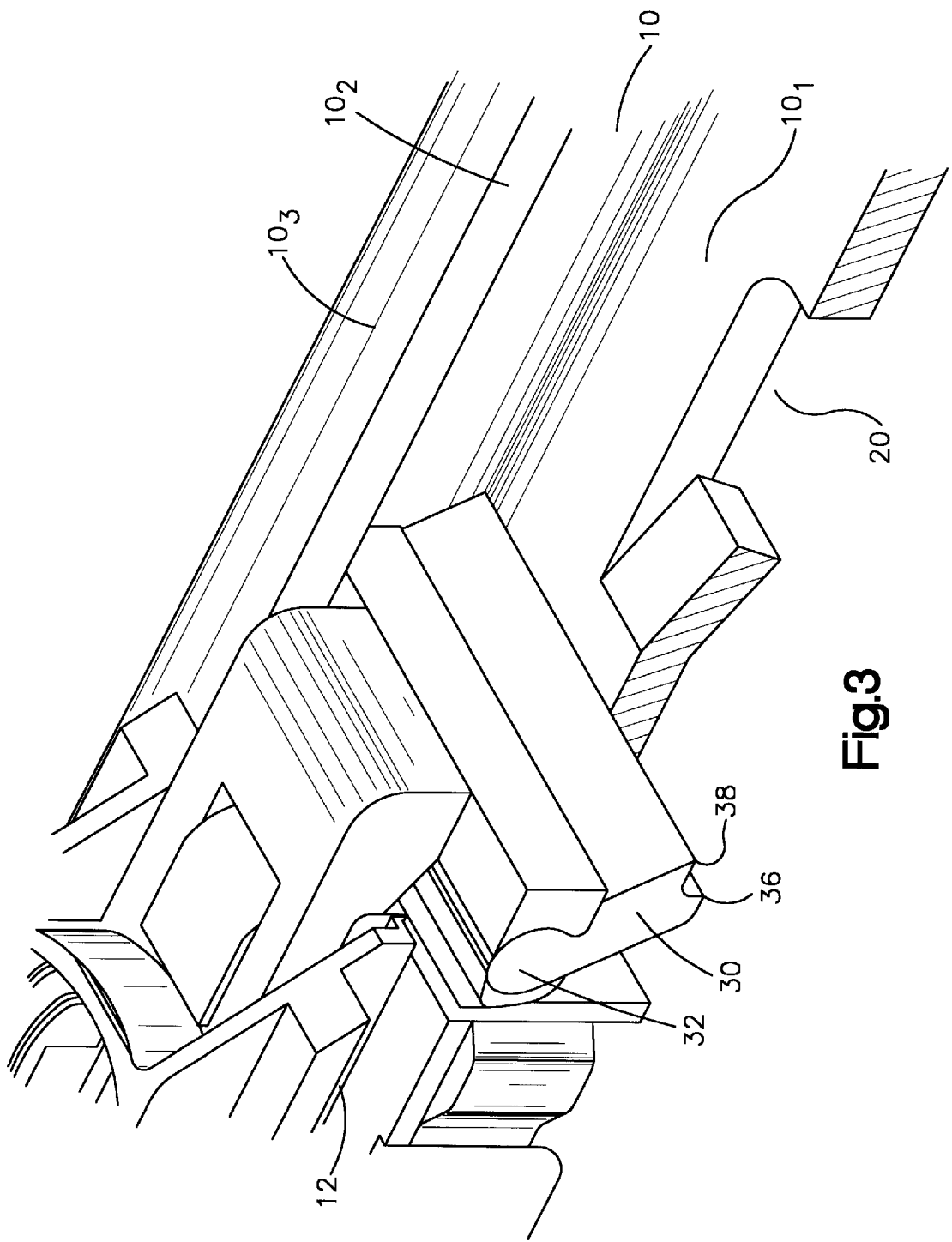
FIG. 3 is a perspective, detailed view of the adjusting device in accordance with FIG. 2.

In FIGS. 2 and 3 a second embodiment of an adjusting device in accordance with the invention is illustrated. In these figures elements already described with reference to FIG. 1 bear the same reference numerals; as regards the function thereof attention is called to the explanation given in connection with FIG. 1.

Unlike the first embodiment, in the second embodiment the locking element comprises a pawl 30. This pawl 30 is adapted to pivot about an axis (which is spaced from its center of gravity and is perpendicular to the side parts $10_2$ of the rail 10) in a bearing part 34, which is manufactured of plastic and is fixedly secured to the slider 12. The locking pawl 30 is provided with an engagement edge 36 on its end adjacent to the bottom part $10_1$ and a support edge 38 parallel to same. The exterior form of the locking pawl 30 has, as viewed in a cross section taken perpendicularly to the pivot axis, an acurate configuration on the support end 32 and a constriction between the support end 32 and the support edge 38 on the downwardly directed side, so that together with the bearing part 34 a pivot bearing is formed.

When the slider 12 is subject to downward acceleration, such movement will be transmitted via the bearing part 34 to the locking pawl 30. Since the point of action of this force is eccentric in relation to the center of gravity of the locking pawl 30, the locking pawl 30 will, owing to its inertia, perform a pivotal movement which is clockwise in terms of FIG. 2. In this respect the engagement edge 36, and if the load is continued, also the support edge 38, will act on the bottom part $10_1$ of the rail 10, and after a small deformation of the bearing part 34 the support end 32 of the locking pawl 30 will engage the front parts $10_3$ of the rail 10. Owing to such jamming of the locking pawl 30 in the interior of rail 10, downward motion of the slider 12 will be reliably precluded.

The invention accordingly provides an adjusting device, involving a reliable and particularly simple design, which stops any downward movement of the slider within a few millimeters, if the detent mechanism is not as intended fitted in a catch opening and the slider is accelerated downward. The locking element is a simply manufactured metal part, which may be stamped or sintered.

I claim:

1. An adjusting device for a deflection fitting of a vehicle safety belt system, comprising a rail provided with catch openings, and a slider mounted displaceably in said rail, said slider being adapted for connection to said deflection fitting and being provided with a detent mechanism for cooperation with said catch openings, said slider being further provided with a locking element which is functionally independent of said detent mechanism, said locking element being mounted at said slider pivotally between a neutral position in which it does not engage said rail, and a locking position in which it engages said rail and locks said slider in place, said locking element being displaced from said neutral position into said locking position by an acceleration of said slider downwards with respect to said rail.

2. The adjusting device of claim 1, wherein said rail comprises a bottom part, two side parts extending perpendicularly to said bottom part, and two front parts extending from said side parts and delimiting a through slot extending in a longitudinal direction of said rail, and wherein said locking element is arranged in the interior of the rail.

3. An adjusting device for a deflection fitting of a vehicle safety belt system, comprising a rail provided with catch openings, and a slider mounted displaceably in said rail, said slider being adapted for connection to said deflection fitting and being provided with a detent mechanism for cooperation with said catch openings, said slider being further provided with a locking element which is functionally independent of said detent mechanism, said locking element being mounted at said slider pivotally between a neutral position in which it does not engage said rail, and a locking position in which it engages said rail and locks said slider in place, said locking element being displaced by an acceleration of said slider downwards with respect to said rail, said rail comprising a bottom part, two side parts extending perpendicularly to said bottom part, and two front parts extending from said side parts and delimiting a through slot extending in a longitudinal direction of said rail, said locking element being arranged in the interior of the rail, said locking element having the form of a parallelpipedon which is able to be pivoted around a pivot axis extending perpendicularly to said side parts and essentially through the center of gravity of said parallelpipedon, said parallelpipedon having two mutually opposite side surfaces which, in the locking position of said parallelpipedon, engage said bottom wall and said front parts of said rail.

4. An adjusting device for a deflection fitting of a vehicle safety belt system, comprising a rail provided with catch openings, and a slider mounted displaceably in said rail, said slider being adapted for connection to said deflection fitting and being provided with a detent mechanism for cooperation with said catch openings, said slider being further provided with a locking element which is functionally independent of said detent mechanism, said locking element being mounted at said slider pivotally between a neutral position in which it does not engage said rail, and a locking position in which it engages said rail and locks said slider in place, said locking element being displaced by an acceleration of said slider downwards with respect to said rail, said rail comprising a bottom part, two side parts extending perpendicularly to said bottom part, and two front parts extending from said side parts and delimiting a through slot extending in a longitudinal direction of said rail, said locking element being arranged in the interior of the rail, said locking element having the form of a locking pawl which is able to be pivoted around an eccentric axis which is perpendicular to said side parts of said rail and is arranged at a support end adjacent said front parts of said rail, said locking pawl having an engagement edge on an end adjacent to said bottom part of said rail.

5. The adjusting device of claim 4, wherein said locking pawl is provided with a support edge which is parallel to said engagement edge.

6. The adjusting device of claim 4, wherein said support end of said locking pawl, as seen in a cross section perpendicularly to said pivot axis, has an acurate outer form.

7. The adjusting device of claim 6, wherein said outer form of said locking pawl, as viewed in a cross section perpendicularly to said pivot axis, has a constriction between said support end and said engagement edge on a side directed downward with respect to said rail.

8. An adjusting device for a deflection fitting of a vehicle safety belt system comprising:

a rail having a plurality of catch openings;

a slider connectable with the deflection fitting and positionable along said rail, said slider having a detent mechanism for engaging at least one of the plurality of catch openings to lock said slider in one of a first plurality of positions along said rail, said slider having a locking element for locking said slider in one of a second plurality of positions along said rail, said locking element being pivotable between a neutral position spaced from said rail and a locking position engaging said rail, said locking element pivoting from said neutral position to said locking position in response to acceleration of said slider relative to said rail above a predetermined acceleration.

* * * * *